United States Patent [19]

Wachholz et al.

[11] Patent Number: 4,698,202

[45] Date of Patent: Oct. 6, 1987

[54] PROCESS FOR INSTALLATION FOR THE CONTROLLED DISCHARGE OF ACTIVITY FROM A REACTOR CONTAINMENT STRUCTURE OF A GAS-COOLED NUCLEAR POWER PLANT

[75] Inventors: Winfried Wachholz, Gorxheim; Ulrich Weicht, Weinheim, both of Fed. Rep. of Germany

[73] Assignee: Hochtemperatur-Reaktorbau GmbH, Fed. Rep. of Germany

[21] Appl. No.: 843,796

[22] Filed: Mar. 25, 1986

Related U.S. Application Data

[63] Continuation of Ser. No. 477,978, Mar. 23, 1983, abandoned.

[30] Foreign Application Priority Data

Apr. 2, 1982 [DE] Fed. Rep. of Germany ....... 3212265

[51] Int. Cl.⁴ ................................................ G21C 9/00
[52] U.S. Cl. .................................... 376/300; 376/298; 376/308; 376/309; 376/313; 376/314
[58] Field of Search .............. 376/313, 310, 314, 300, 376/309, 283, 298, 299, 301, 308; 55/312, 313, 314

[56] References Cited

U.S. PATENT DOCUMENTS

| | | | |
|---|---|---|---|
| 2,743,225 | 4/1956 | Ohlinger | 376/310 |
| 3,028,327 | 4/1962 | Weeks | 376/310 |
| 3,115,450 | 12/1963 | Schanz | 376/283 |
| 3,228,848 | 1/1966 | Fellows | 376/310 X |
| 3,322,141 | 5/1967 | Gaus, Jr. et al. | 376/314 X |
| 3,438,857 | 4/1969 | Sulzer | 376/283 |
| 3,482,377 | 12/1969 | Walrave | 376/314 X |
| 3,556,941 | 1/1971 | Takahashi | 376/314 |
| 3,871,842 | 3/1975 | Queiser et al. | 376/314 X |
| 3,976,541 | 8/1976 | Stiteler et al. | 376/310 |
| 3,998,057 | 12/1976 | Haferkamp et al. | 376/393 |
| 4,022,659 | 5/1977 | Baumgaertner et al. | 162/19 |
| 4,025,387 | 5/1977 | Haferkamp et al. | 376/394 |
| 4,057,464 | 11/1977 | Mair et al. | 376/314 |
| 4,157,001 | 6/1979 | Pickles | 52/506 |
| 4,167,444 | 9/1979 | Schweiger | 376/310 |
| 4,185,584 | 1/1980 | Brodine et al. | 376/250 X |
| 4,187,146 | 2/1980 | Shen et al. | 376/310 X |
| 4,221,262 | 9/1980 | Baumgaertner et al. | 376/394 X |
| 4,383,969 | 5/1983 | Bleier | 376/313 |

FOREIGN PATENT DOCUMENTS

| | | | |
|---|---|---|---|
| 2057244 | 5/1971 | France | 376/314 |
| 0068397 | 6/1978 | Japan | 376/310 |
| 0020298 | 2/1979 | Japan | 376/314 |
| 868672 | 5/1961 | United Kingdom | 376/314 |

OTHER PUBLICATIONS

Nucleonics, vol. 23, No. 10, Oct. 65, p. 51.
ANS Transactions, "Plant Engr. and Analysis", vol. 19, Oct. 74, pp. 311, 312, 314.

Primary Examiner—Deborah L. Kyle
Assistant Examiner—Daniel Wasil
Attorney, Agent, or Firm—Robert J. Koch

[57] ABSTRACT

A process for the controlled discharge from a reactor containment structure of a gas cooled nuclear power plant and the installation for achieving this process include parallel discharge circuits from a reactor containment structure to a discharge stack. The flow of discharge from the reactor containment structure normally flows in a primary discharge circuit and may be directed wholly or partially to the parallel secondary discharge circuit. The secondary discharge circuit contains means for reduction of the temperature of the discharge, means for deposition of particulate fission products and they also contain means for recombination of combustible gases and means for filtration of the discharge. Nuclear power plant installations and processes for controlling the discharge from a reactor containment structure in this fashion permit safe discharge of naturally occurring leakage for gas cooled nuclear reactors, as well as leakage occurring in the event of reactor failure.

16 Claims, 1 Drawing Figure

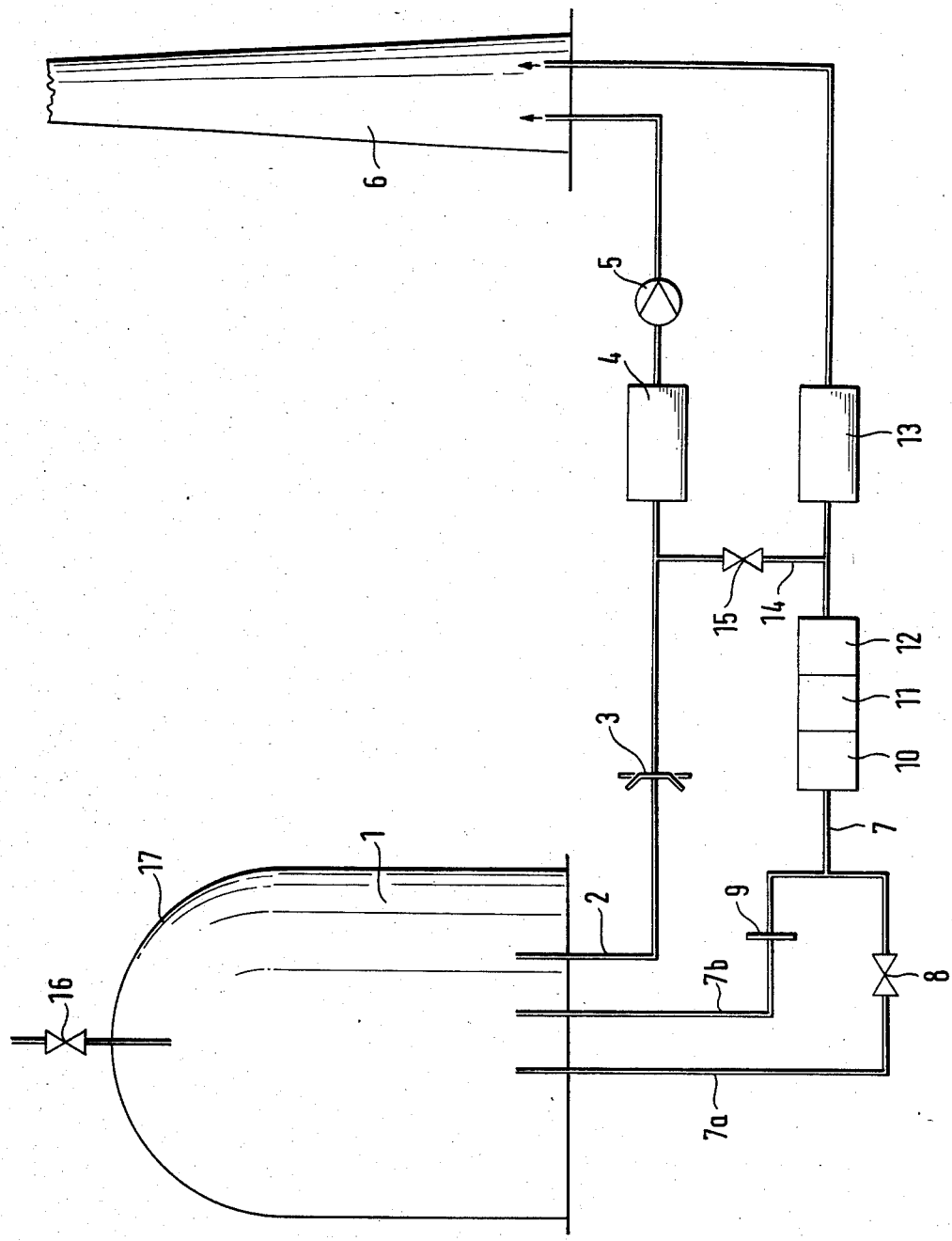

PROCESS FOR INSTALLATION FOR THE CONTROLLED DISCHARGE OF ACTIVITY FROM A REACTOR CONTAINMENT STRUCTURE OF A GAS-COOLED NUCLEAR POWER PLANT

This application is a continuation of application Ser. No. 477,978, filed Mar. 23, 1983, now abandoned.

BACKGROUND OF THE INVENTION

1. Field of the Invention

The invention concerns a process for the controlled discharge of activity from a reactor containment building of a gas cooled nuclear power plant. The invention also relates to the power plant having a reactor containment building which, as a barrier against the release of active cooling gas to the environment, encloses the nuclear power plant and is equipped with a discharge circuit for cooling gas leakages occurring during normal operation. The discharge circuit includes an operational filter system, exhaust gas blower and a stack.

2. Background of the Art

The state-of-the-art includes nuclear power plants comprising high temperature reactors installed within reactor pressure vessels. These vessels are in turn surrounded by a containment vessel or containment building. One of the functions of a containment building is to prevent the release of fission products to the environment. In the case of the known AVR (from the German word Atomversuchsreaktor which translates as Experimental Atomic Reactor) nuclear power plant, the containment vessel is under a slightly negative pressure during operation in order to prevent leakage from the primary circuit into the atmosphere. Because the AVR installation uses fuel elements coated with fission material particles, the activity of the cooling gas in the primary circuit is slight to begin with. In the nuclear power plants with high temperature reactors, it is specified to the containment vessel for pressures that enable the containment vessel to absorb any leakage occurring in operation and due to incidents of reactor failure or nuclear accident. This design is known as full pressure containment. It is also known in these power plants to discharge the cooling gas leakages originating in the reactor pressure vessel and the radioactive circuits to the environment in a delayed manner through filter paths and a stack. Even in the case of severe incidents, such as the failure of a seal of the reactor pressure vessel, the exiting cooling gas is retained and discharged through the filter and the stack in a controlled manner. The effects of the incident remain limited in this manner.

In the THTR=300 nuclear power plant, the discharge of cooling gas leakages occurring during normal operation and in minor incidents is effected into the atmosphere through a filter system, an exhaust air blower and a stack. The reactor containment building surrounding the reactor pressure vessel is not laid out, however, for containment of the full pressure. In the case of incidents releasing large amounts of a leakage, these leakages are released to the atmosphere unfiltered through the stack to the environment.

SUMMARY OF THE INVENTION

The invention based on this state-of-the-art comprises providing in the above-described nuclear power plant a process and a power plant structure, whereby the filtered discharge even of large leakages may be effected without requiring the conventional "full pressure design" of the reactor containment structure.

According to the process of the invention, a pressure rise in the reactor containment structure over a predetermined limiting value causes the discharge conduit (hereinafter also referred to as a path or circuit) provided for normal operation to automatically close. At the same time, a controlled relief of the reactor containment building is effected by the opening of a secondary discharge path substantially parallel to the discharge path used during normal operation. The leakages originating in the primary circuit are then conducted through a filter system for gaseous fission products and suspended substances in the stack for temperature reduction and the deposition of fission products.

The invention makes it possible to design a reactor containment building for a maximum pressure factor that is less than heretofor possible and without risking the failure of the reactor containment structure as the result of an incident. Depending on the design pressure of the reactor containment structure, which is determined additionally by further requirements, such as for example, protection of the reactor pressure vessel against external effects, the limiting values for the closing of the discharge path provided for normal operation, together with the limiting values for the secondary discharge path to be used in the case of incidents, may be chosen at different levels. In this fashion, the design requirements for the reduction of temperature and the deposition of fission products may also vary significantly for each power plant.

Advantageously, the period of time during which the reactor containment structure is exposed to excessive pressure may be affected by means of the determination of the limiting value at which the secondary discharge path is opened. Thereby, the pressure in the reactor containment structure is relieved by the outward flow of the contents of this building. It is also advantageous that the amount of air in the reactor containment structure is reduced following the relief of pressure so that the intrusion of air into the primary circuit is also reduced.

Even in the case of hypothetical incidents, the discharge of fission products to the environment is strongly reduced. This is due to the devices built into the secondary discharge path which have a delaying effect. In this manner, short-lived fission products are decomposed even while passing through the discharge path. Long-lived fission products are retained both in the solid and the gaseous form in the corresponding components of the power plant adapted for that purpose. In this fashion, the temperature exposure of the environment is also reduced.

A power plant utilizing the process according to the invention comprises means for the opening of a secondary discharge path. Such means may include an actively operated fitting or valve and a rupture disk. By the existence of two different and redundant arrangements, one of which is actuated actively and the other of which is passively effective, the failure of the reactor containment structure may be excluded. The rupture disk is designed so that it responds not only in case of a failure of the fitting or valve, but also during an excessively rapid rise of the pressure in the reactor containment structure.

The power plant utilizing the process according to the invention further comprises an automatically closing check valve with locking means. This valve is arranged in the discharge path provided for normal operation. With this check valve, the normal discharge path is automatically closed off in the event of major leakages. Thus, the entire leakage of the cooling gas initially remains in the reactor containment structure. Simultaneously, or at a later point in time, the parallel (also referred to as "secondary") discharge path is opened and the leaked gas may be discharged over this path.

The means provided according to the invention for the reduction of temperature in the secondary discharge path is preferably in the form of regenerative heat exchangers. These are comprised of piles of pebbles of a heat absorbing material. Graphite spheres are the preferred heat absorbing material. Examples of regenerative heat exchanges of this type may be found in Littmann, H., Barile, R. G., Pulsifer, A. H., Ind. Eng. Chem. Fundamentals, Vol. 7,4(1968),554, the disclosure of which is incorporated herein.

The means for the reduction of temperature and the means for the deposition of fission products in the secondary discharge path may be followed in line, if necessary, by means for a recombination of the combustible gases. By using the recombination means, the accumulation of combustible gases in the reactor containment structure may be prevented in the event of occurrence of a hypothetical incident, such as an incident resulting in the thermal decomposition of the concrete of the reactor pressure vessel.

The means for the retention of fission products and means for the recombination of combustible gases may be entirely or partially identical with the regenerative heat exchangers. Regenerative heat exchangers are known devices in themselves. Examples of regenerative heat exchangers, containment vessels, cooling circuits, concrete vessels and the like suitable for use in the instant invention are disclosed in U.S. Pat. Nos. 3,998,057; 4,022,659; 4,025,387; 4,157,001, and 4,221,262, the disclosures of which are incorporated herein.

The effectiveness of the apparatus for carrying out the process according to the invention may be further improved by providing a connecting line between the discharge paths in front of the filter system of the two discharge paths and in the direction of flow. A cut-off fitting or valve is arranged in this connecting line. By the opening of this cut-off fitting, in case of a closed normal discharge path, both the operational filter system and the exhaust blower may be used for the removal of the leakage through the second discharge path. It also becomes possible to again achieve negative pressure over the long term in the reactor containment structure in this manner.

A further securing of the reactor containment structure against excessive pressure is provided in a preferred embodiment by a safety valve arranged in the upper area of the reactor containment structure. This safety valve is designed so that its response pressure is higher than the response pressure of the rupture disk and of the check valve.

A safety valve that may also be opened by active intervention is preferably used in this embodiment. Intentional opening of this valve may be desirable, for example, in an emergency such as the destruction of the stack. Upon such an occurrence, the unfiltered discharge of the contents of the reactor containment structure (which may be, for example, a building with a dome shaped top) at the height of the cupola of this structure would be preferable to a filtered discharge in ground vicinity.

BRIEF DESCRIPTION OF THE DRAWING

In the drawing, an embodiment of the process according to the invention is shown schematically.

DETAILED DESCRIPTION OF THE PREFERRED EMBODIMENT

The drawing FIGURE shows a reactor containment structure in the form of a building in which a nuclear power plant with a gas cooled high temperature reactor is housed. A first discharge path 2 is illustrated as coming from the reactor containment building 1 for the leakage of cooling gas occurring during normal operation. The following elements are arranged in the direction of flow in the discharge path 2: a check valve 3 with locking means, an operating filter system 4 to retain solid fission products, an exhaust blower 5 and a stack 6.

Parallel to the first discharge path 2 used during normal operation, a secondary discharge path 7 is provided. The latter is divided in the area adjacent to the reactor containment building 1 in two parallel paths 7a and 7b. A valve 8 is arranged in path 72, while a rupture disk 9 is located in path 7b. Following the joining of the two paths 7a and 7b, a regenerative heat exchanger 10, a deposition course 11 for solid fission products, together with a recombination device 12 for combustible gases are provided. This discharge path 7 further includes a filter system 13 for gaeous fission products such as iodine and suspended particles. The path enters the stack 6 after the filter system 13.

The two discharge paths 2 and 7 are connected with each other by means of a connecting line 14, in which a cut-off valve 15 is installed. The connecting line 14 leaves the discharge path 7 as viewed in the flow direction, in front of the filter system 13 and enters the discharge path 2 in front of the filter system 4. With the cut-off valve 15 open, a partial flow of the cooling gas leakage to be discharged may be passed over the filter system 4.

In the cupola 17 of the reactor containment building 1, a safety valve 16 is arranged. This safety valve has a higher actuating pressure than the check valve 3 and the rupture disk 9. Safety valve 16 may also be opened intentionally.

During normal operation the reactor containment building 1 is maintained at a negative pressure in relation to its environment. The valves 8 and 15 and the safety valve 16 are closed. The rupture disk 9 is intact. The exhaust air is discharged through the first discharge path 2, i.e. through the check valve 3, the operating filter system 4 and the exhaust blower 5, together with the stack 6, into the atmosphere.

In case of operating incidents involving small leakages, the latter are again discharged through the discharge path 2. In the process, a positive pressure in relation to the environment may be established in the reactor containment building 1. The magnitude of the leakage flow permissible for the discharge path 2 depends on the maximum temperature to which the filter system 4 may be exposed.

In the case of incidents resulting in large cooling gas leakages whereby the operating filter system 4 is exposed to unacceptably high temperatures or when at the check valve 3 a large pressure difference is generated, the discharge path 2 is closed off by means of the automatic closing and locking of the check valve 3 and the entire volume of the cooling gas leakage is retained in the reactor containment building 1.

The controlled relief or discharge of the reactor containment building 1 is now effected through the secondary discharge path 7, i.e. through the path 7a by opening the valve 8. The cooling gas leakages now pass through the regenerative heat exchanger 10, the deposition course for solid fission products 11, the recombination device 12, the filter system 13 and the stack 6 into the environment. If necessary, the operating filter system 4 and the exhaust air blower 5 may also be utilized for the discharge of leakage, in addition to the filter system 13. Over the long term, negative pressure may thereby be reestablished in the reactor containment building 1.

In case of a failure of the valve 8 or a rapid rise in pressure in the reactor containment building 1, the rupture disk 9 located in the discharge path 7b is caused to rupture and the cooling gas leakage can be discharged over the above-described path, i.e., through the regenerative heat exchanger, deposition course, recombination device, filter system and stack.

The safety valve 16 serves to further secure the reactor containment building 1 against failure due to excessive pressure. It is designed so that it is actuated only when with the first discharge path 2 closed, the rupture disk fails to respond.

The detailed configuration and structure of each of the devices individually in the discharge path for normal operation as well as the devices in the secondary discharge path are known in themselves and are described in numerous patent and literature references. Variations of the devices as well as additional and supplemental devices may be employed within the scope of the invention without deviating from the general inventive concept.

What is claimed is:

1. A nuclear power plant installation comprising:
    a reactor containment structure housing a gas-cooled nuclear reactor, and serving as a barrier against the release of radioactive cooling gas to the environment;
    a discharge stack separate from said reactor containment structure;
    a primary discharge circuit from said reactor containment structure to said discharge stack for carrying a flow of discharge including cooling gas leakages which occur during normal operation from said containment structure to said discharge stack;
    a secondary discharge circuit from said reactor containment structure to said discharge stack for carrying a flow of discharge from said containment structure to said discharge stack;
    said primary discharge circuit and secondary discharge circuit having separate outlets from the containment structure and inlets to said discharge stack;
    means disposed within said primary discharge circuit for closing the flow of discharge to said primary discharge circuit upon the occurrence of a first set of predetermined conditions in said reactor containment structure;
    means disposed within said secondary discharge circuit for opening the flow of discharge to said secondary circuit upon the occurrence of a second set of predetermined conditions in said reactor containment structure wherein said secondary discharge circuit outlet comprises a first conduit and a second conduit and said means for opening includes means for actively controlling pressure in said first conduit and means for passively controlling pressure in said second conduit.

2. The nuclear power plant installation of claim 1, wherein said means for closing said primary discharge circuit comprises a closing check valve and means for locking said closing check valve.

3. The nuclear power plant installation of claim 1, wherein said means for opening the flow of discharge to said secondary circuit comprises a valve and means for automatically or manually opening said valve based on pressure and/or temperature conditions in said reactor containment structure and means for opening the flow of discharge in said secondary circuit by rupture of a barrier in said circuit.

4. The nuclear power plant installation of claim 3, wherein said valve and said rupture means are arranged in parallel.

5. The nuclear power plant installation of claim 1, further comprising:
    an operating filter system and exhaust air blower in said primary discharge circuit, and
    means for reduction of temperature of said discharge;
    means for deposition of particulate fission products carried by said discharge, and
    means for filtration of gaseous fission products and suspended substances in said discharge; said reduction, deposition and filtration means connected in series in said secondary discharge circuit.

6. The nuclear power plant installation of claim 5, further comprising means for recombination of combustible gases, said means being connected in series to said reduction, deposition, and filtration means in said secondary discharge circuit.

7. The nuclear power plant installation of claim 5, wherein said means for reduction of temperature of said discharge comprise regenerative heat exchangers.

8. The nuclear power plant installation of claim 7, wherein said regenerative heat exchangers comprise piles of heat absorbing graphite spheres.

9. The nuclear power plant installation of claim 7, wherein said regenerative heat exchangers also comprise said deposition means, filtration means and/or said recombination means.

10. The nuclear power plant installation of claim 6, further comprising a conduit connecting said primary and said secondary discharge circuits downstream from said reduction, deposition and recombination means.

11. The nuclear power plant installation of claim 6, further comprising a safety relief valve in said reactor containment structure independent from said primary and secondary discharge circuits.

12. The nuclear power plant installation of claim 11, further comprising means for manual opening of said safety relief valve.

13. A process for the controlled discharge from a nuclear reactor containment structure of a gas cooled nuclear power plant having a primary discharge circuit and a secondary discharge circuit having separate outlets from the containment structure and inlets to a discharge stack comprising:
    continuously measuring the pressure in the reactor containment structure,
    closing off the primary discharge circuit from said reactor containment structure to said discharge stack upon the rise in pressure in said reactor containment structure above a predetermined limit;

actively actuating a first device for opening the secondary discharge circuit and passively actuating a second device for opening the secondary discharge circuit upon an additional rise is pressure in said reactor containment structure, for reduction of temperature, deposition of fission products and filtration of the discharge from said reactor containment structure, by means within the secondary discharge circuit, and directing the flow of said discharge through said secondary discharge circuit path to said discharge stack.

14. The process of claim 13, wherein said opening of said secondary discharge circuit is simultaneous with said closing of said primary discharge circuit.

15. The process of claim 13, wherein said opening of said secondary discharge circuit is delayed after said closing of said primary discharge circuit.

16. The process of claim 13, further comprising directing the flow of discharge through a portion of said primary discharge circuit after flow through a portion of said secondary discharge circuit.

* * * * *